Figure 1:
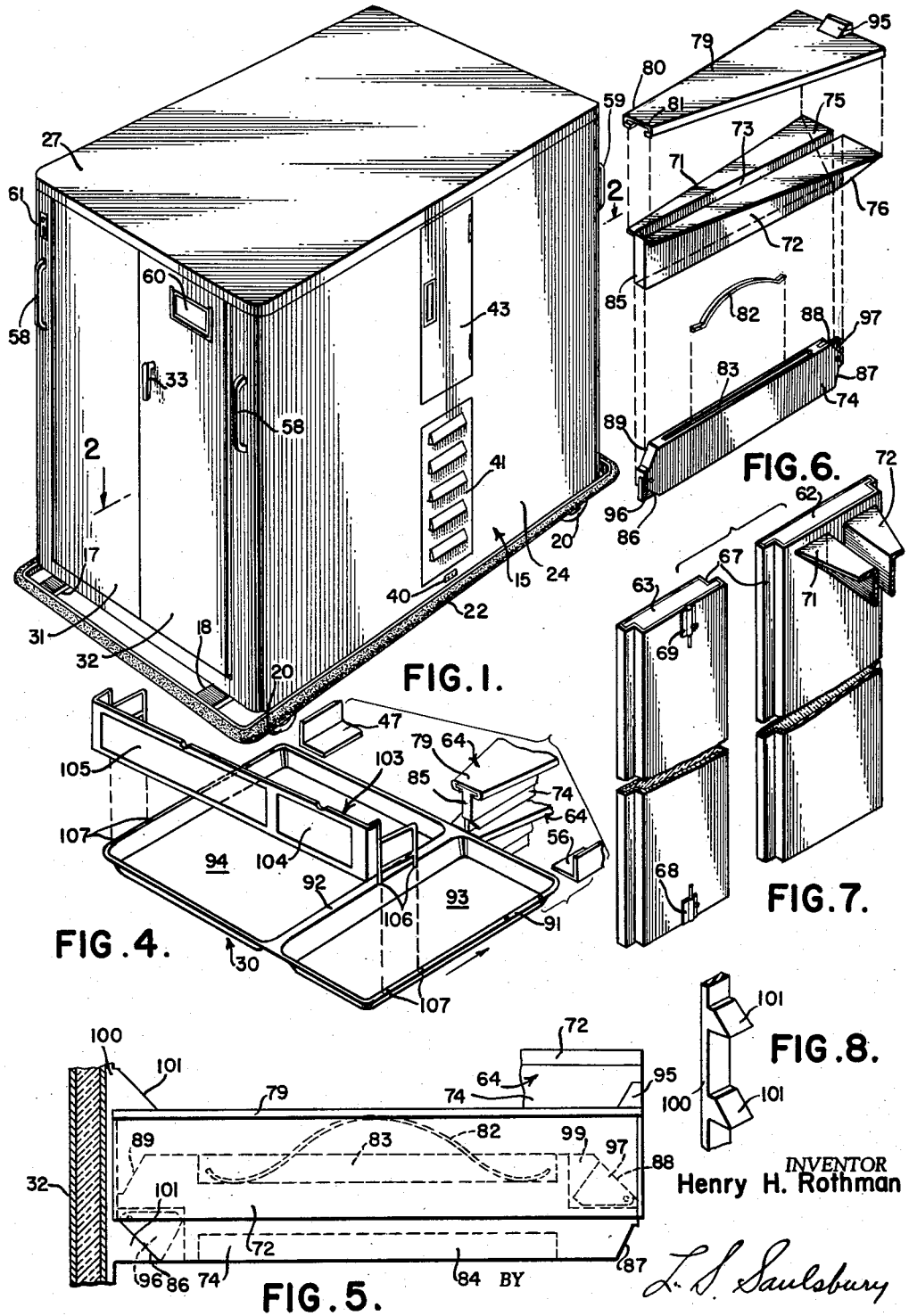

INVENTOR
Henry H. Rothman
BY L. S. Saulsbury
ATTORNEY

United States Patent Office 3,160,452
Patented Dec. 8, 1964

3,160,452
HOT AND COLD FOOD SERVICE CART
Henry H. Rothman, Jackson Heights, N.Y., assignor, by direct and mesne assignments, to United Service Equipment Co., Inc., Palmer, Mass., a corporation of Delaware
Filed Sept. 30, 1959, Ser. No. 843,489
20 Claims. (Cl. 312—236)

This invention relates to hot and cold food service carts for conveying food on trays from the food preparation kitchens to locations removed therefrom. In hospitals, the patients' food is put on trays and placed in these food service carts to be taken to the various floors and corridors and positioned outside the patients' rooms for the final delivery of the trays with food to the patients. Heretofore, with these food service carts, the individual trays bearing the cold foods were put in a cold compartment and the hot foods were put on fixed slide trays in the heated compartment. The hot food had to be removed from the heated compartment and placed on the cold food tray before the tray was delivered to the patient, and as well the hot beverage, with attendant rearrangement of the food and beverage items upon the tray thereby, making extra effort at the point of delivery of the trays, removed from the kitchen and the possibility of the dietician's loss of control of the food. These food carts carry their own cooling and heating equipment that are supplied with electric current from an electrical receptacle in the hospital corridor.

It is the principal object of the present invention to provide a hot and cold food service cart in which both hot and cold foods, including the beverages, will be placed upon the one tray and upon the tray being slid into the cart one portion of the tray bearing the hot foods enters a heated compartment that keeps the hot foods in their hot state, while the other portion of the tray bearing the cold foods enters a cold compartment that keeps the cold food in a cold state, there being but one tray divided intermediate its length to provide a division wall that will cooperate with an especially constructed depending division wall structure that keeps the air in the cold and hot compartments of the cart separated and the respective foods hot and cold.

It is another object of the invention to provide a hot and cold food service cart in which the divisional wall structure can be rearranged within the cart to be located for either winter or summer use as when the greater hot foods are being served in the winter, a larger hot compartment is used and the cold compartment is small, while for summer serving the cold compartment is large and the hot compartment is made small, and wherein by simply placing the trays into the cart with the opposite edge so that the rib on the tray dividing the tray into small and large portions is placed in the divisional wall structure from the opposite long side edge of the tray.

It is still another object of the invention to provide in the divisional wall structure of a hot and cold service cart a spring biased lift bar for each tray that is automatically elevated by the tray partition rib as the tray is slid into the cart and which is automatically lowered to fully separate the compartments as the tray is removed therefrom and wherein there is provided upon the lift bar pivoted end closure pieces making for easy starting of the tray into the compartments for the movement of the tray thereunder, yet upon the tray being removed and the lift bar being lowered and providing for adequate closing or separation of the hot and cold compartments at the starting end of the lift bar to prevent air leakage between the hot and cold compartments.

It is a further object of the invention to provide in a hot and cold food service cart, adequate sealing means on the door interior in vertical alignment with the division wall structure that engages with the undersides and inclined edges of the tray to keep and prevent air leakage between hot and cold compartments that tends to flow under the forward edge of the tray, these spaces being filled automatically upon the closing of the divided compartment doors and engagement of the sealing strip projections with the undersides and edges of the tray.

It is a still further object of the invention to provide in a food service cart, a removable baffle member adapted to be carried on the front edge of the tray and elevated thereabove to close off the compartment space in front thereof and reduce loss of hot and cold air upon the doors being opened to provide access to the trays and thereby to maintain the hot or cold air for the individual trays and wherein this partition serves as a card holder to identify the contents of the food tray and the patient to whom the tray is to be delivered.

Other objects of the invention are to provide a hot and cold food service cart, having the above objects in mind, which is of simple construction, easy to manipulate, light in weight, has a minimum number of parts, of pleasing appearance, durable, sanitary, easy to keep clean, efficient and effective in use.

For a better understanding of the invention, reference may be had to the following detailed description taken in connection with the accompanying drawing, in which—

Figure 2:
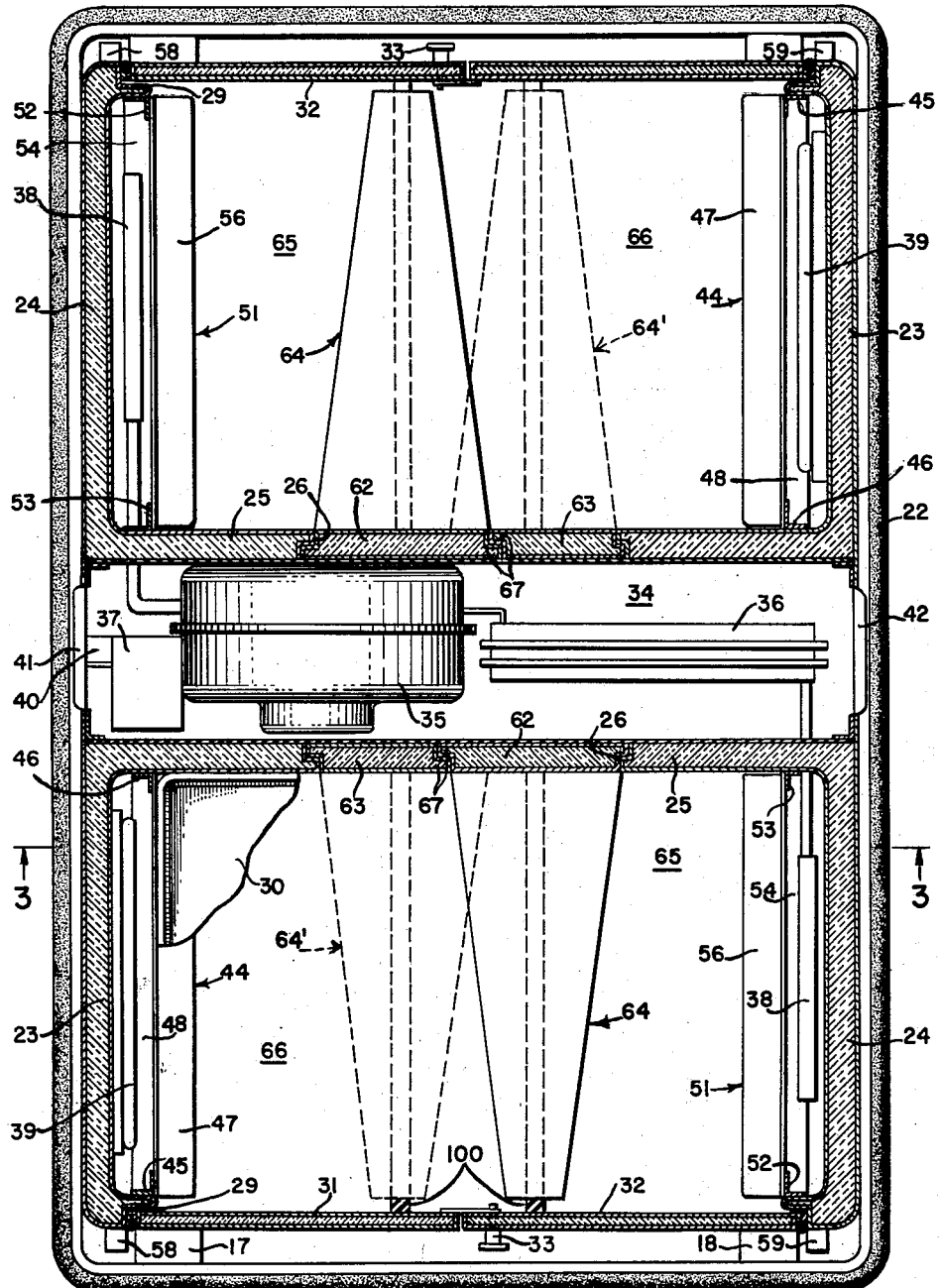
Figure 3:
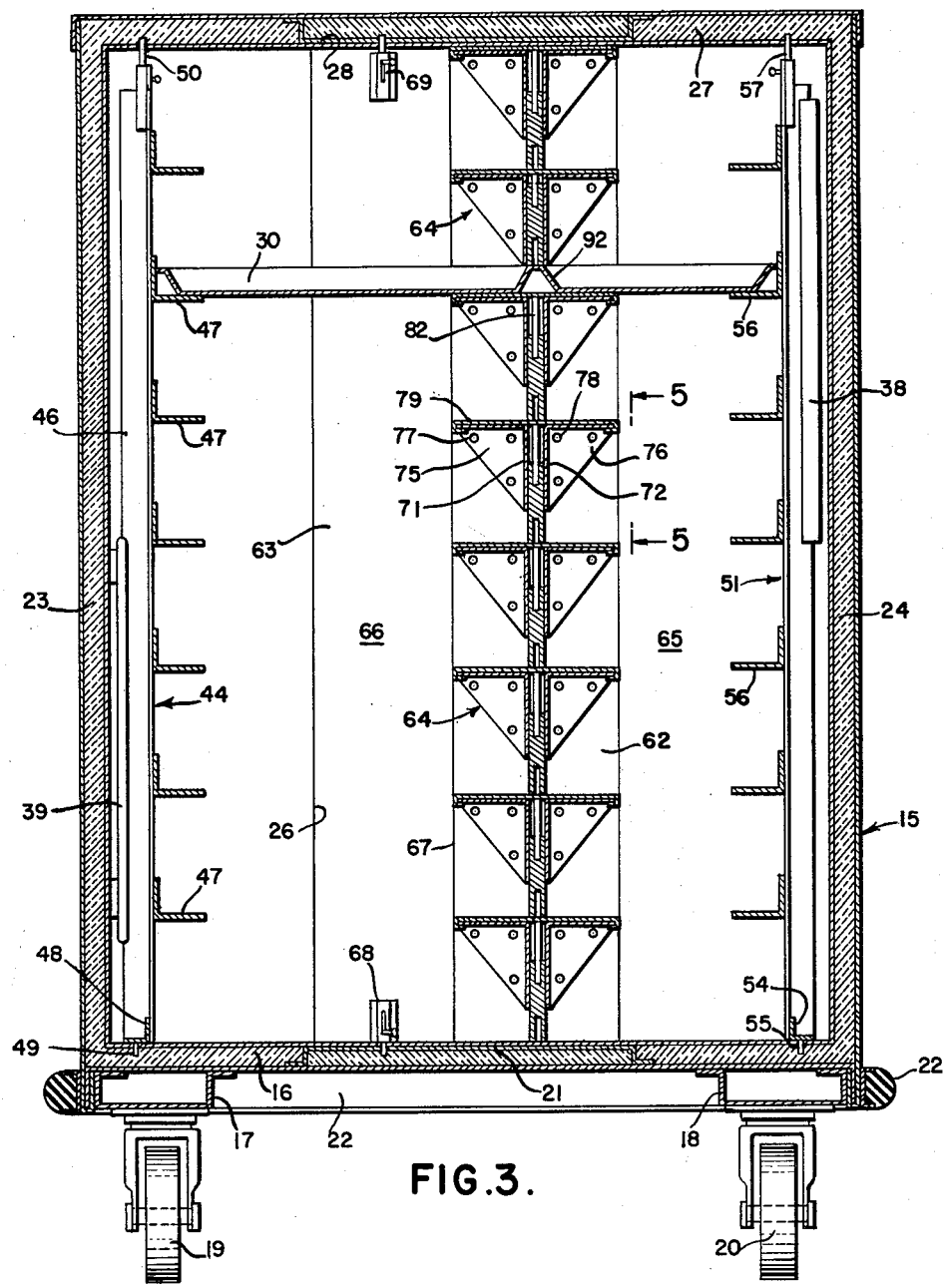

FIGURE 1 is a perspective view of the food service cart bearing the features of the present invention, FIG. 2 is an enlarged horizontal longitudinal sectional view taken of the cart on line 2—2 of FIG. 1, FIG. 3 is an enlarged vertical sectional view taken generally on line 3—3 of FIG. 2, FIG. 4 is a perspective and collective view of the tray and of the front compartment closure and card holder, FIG. 5 is an enlarged side elevational view of one of the individual wall closure assemblies as viewed generally on line 5—5 of FIG. 3, FIG. 6 is an exploded and perspective view of the parts of one of the individual divisional wall assemblies, FIG. 7 is a fragmentary and perspective view of the interchangeable wall boards, one of which supports the vertically-spaced individual divisional wall assemblies, and the other of which is removable and inverted to fill space on the opposite sides of the one wall board, and FIG. 8 is a fragmentary perspective view of the rubber seal that is mounted on the interior of the doors of the cart for engagement with the bevel underside of the edges of the tray to prevent leakage of air between the hot and cold compartments.

Referring now particularly to FIGS. 1, 2 and 3, 15 represents generally the exterior of the cart which has a reinforced insulated bottom 16 with longitudinally-extending reinforcing bottom runners 17 and 18 extending along the opposite sides thereof and to which caster wheels 19 and 20 are respectively connected for the support and movement of the cart over the floor surface and through the hospital corridor. The bottom 16 has a reinforcing plate 21 running longitudinally through the center of the cart to give added stiffness to the bottom thereof. A bumper band 22 of rubber extends around the full periphery of the cart at the bottom thereof and about the runners 17 and across the ends of the cart. Insulated side walls 23 and 24 extend upwardly from the bottom 16 at each opposite end of the cart and are joined by an insulated transverse inner wall 25 having a vertically-extending recess 26 therein. An insulated top 27 with a reinforcing plate 28 therein runs longitudinally over the full length of the cart. Thus, there is provided two general enclosures, one at each end of the cart. Each enclosure is provided with a door opening 29 through which divided trays 30 are placed into and removed from the cart. This opening is closed by separable doors 31 and 32 hinged respectively to the opposite sides of the opening 29 and are held closed at the center of the opening by a hand lock 33 on the door half 32. The inner walls 25 of the enclosures are spaced from one another along the cart to provide an intermediate compartment 34 for refrigerating equipment including a compressor 35, a condenser 36, and an electric control and distributing box 37. Refrigerant is delivered through appropriate piping to cooling coils 38, one in each enclosure at one side of the cart and adapted to cause the air to be cooled at the one side of the enclosure. The opposite side of each enclosure is provided with an electric heating unit 39 that will be supplied with current from the electric control box 37 by suitable wiring not shown and while the refrigerating equipment is being similarly supplied. A cable cord, being attached to a suitable receptacle outlet in the hospital carridor, is connected to a receptacle 40 which may be located at any suitable place on the cart to pass the current to control box 37 and to the compressor 35 and heating units 39. The cooling coil 38 is in an elevated position on the one side wall 24 of the enclosure while the heating unit 39 is in a lowered position on the opposite side wall 23 thereof. Removable louvered plates 41 and 42 are respectively disposed in the respective side walls to allow for the ventilation of the refrigerating equipment and the intermediate compartment 34. At least above one of the removable louvered plates is a door 43 through which access can be had to the upper part of the compartment 34 and to any accessories that may be disposed in the top of the compartment, and to wiring, fuses, switch buttons and the like.

Extending vertically and adjacent to the side wall 23 in each enclosure, is a removable supporting rack 44 comprising vertically-extending, laterally-spaced angle bar supports 45 and 46 on which are fixed vertically-spaced angle slide tray supporting bars 47. A lower bar 48 of the rack 44 is held in position by a pin 49 engaging with a hole in the cart bottom 16, FIG. 3. Slide latches 50 are respectively provided upon the vertically-extending angle pieces 45 and 46 for releasably latching the upper end of the rack 44 to the top 27 of the cart. The electric heating unit 39 is fixed to the wall 23 and is disposed behind the rack 44.

At the opposite side of each enclosure is an opposing tray slide supporting rack 51 formed of vertically-extending, laterally-spaced angle bar supports 52 and 53 joined together at their lower ends by a bottom angle piece 54 with fixed pins 55 adapted to enter holes in the bottom 16 to hold the rack 51 against displacement therover, FIG. 3. The rack 51 extends upwardly parallel to the side wall 24 and has vertically-spaced angle slide tray supporting bars 56 and slide latches 57 provided respectively on the upper ends of the respective angle bar supports 52 and 53 and engageable with the top 27 to hold the rack thereat. This tray rack 51 is removable from the cart in order to provide easy access to the cooling coil 38 that lies behind it. Adequate handle grips 58 and 59 are respectively provided on the opposite ends of the cart for pushing the cart upon its wheels 19 and 20 over the floor surface, FIGS. 1 and 2. Data information will be provided in a card rack 60 on the half door 32. A telltale light signal for indicating the operation of the cooling and heating equipment is appropriately provided on at least one end of the cart as indicated at 61, FIG. 1.

In the vertically-extending recess 26 for the inner wall 25 of each compartment are two vertically-extending break-away plates 62 and 63, FIGS. 2 and 7. The plate 62 is wider than the plate 63 and serves as the support for a plurality of divider bar assemblies indicated respectively and generally at 64, FIGS. 2 and 3, there being eight such structures shown, one lying above the other and forming a normally-closed thermal barrier means or divisional wall structure between the opposite side walls of the enclosure, so as to confine the cold air to a cooling compartment 65 at one side of the enclosure that has the cooling coil 38, and to confine the hot air to a heating compartment 66 at the opposite side thereof that has the heating unit 39. The vertical sides of the opening 26 in the inner wall 25 are mitered and the sides of the break-away plates 62 and 63 are also mitered to fit the sides of the opening 26. Reverse miters 67 are provided on the plates 62 and 63 for joining them together. The plate 63 serves as a filler plate and has the lower and upper slide latches 68 and 69, FIGS. 3 and 7 that are extended respectively into openings in the reinforced bottom 16 and top 27.

When it is desired to provide more space for the cold air compartment 65 as in the summer when more cold foods are served and there is less demand for hot foods, the break-away plate 63 is removed and the break-away plate 62 is slid laterally so that the divisional wall structure 64 will lie in a dotted line position 64', FIG. 2, so as to provide less space for the heating compartment 66 and more space for the cold compartment 65. The break-away plate 63 is then inverted or turned upside down and fitted in the right side of the break-away plate 62 as viewed in FIGS. 2 and 3. Again when a greater amount of hot food than cold foods are to be served, the breakaway plate 62 can be returned to its initial position so as to provide more space for the hot food.

Each divisional wall assembly 64 has two opposing angled iron pieces 71 and 72 having tapered side edges and spaced from one another to provide a vertical slot or space 73 in which a lift bar closure 74 is elevated. The opposing angle iron pieces respectively have mounting flanges 75 and 76, FIG. 3 which by the use of screws or rivets 77 and 78 secure the pieces 71 and 72 to the inner face of the break-away plate 62. Slidable over the top of the angled pieces 71 and 72 and along the tapered flange edges thereof is a cover piece 79 that has rolled-over tapered side portions 80 and 81 to receive the flange edges and to hold the cover piece 79 against upward displacement therefrom yet removable to provide access to the vertical slot 73 for the removal of the lift bar 74 to reverse it yet providing a piece against which a bowed spring 82 may react extending from a slot 83 in the lift bar 74 at one edge or from slot 84 at the opposite edge. The outer end of the space 73 is closed by an end wall 85 so that the lift bar 74 is held against endwise displacement from the space 73. The ends of the lift bar 74 are cut away as indicated at 86 and 87 at one edge and 88 and 89 at the opposite edge. The lift bar 74 can be turned from end to end and upside down as the same becomes worn away, the cut away parts 86 and 88 serve as starting ends for the edge of the tray 30 when it is to be slid over the rack bars 47 and 56 and into the hot and cold compartments. The tray 30 has a peripheral flange 91 and a vertically-extending rib 92 intermediate the length thereof to provide a small food area 93 at one end of the tray and a large food area 94 at the opposite end of the tray. During the winter months the hot food would be put on the larger space 94 while the cold food would be put on the smaller space 93. The rib 92 will, as the edge is presented to the bevel edge 86 or 88, cause the lift bar 74 to be lifted upwardly in the space 73 against the action of the bow spring 82.

In order that the end of the space 73 is closed off to prevent leakage of cold and hot air around the lift bar at the inner end of the tray the lift bar is lowered so that its bevel end 87 or 89 fits a cooperating inclined projection 95 on the top and inner end of the cover piece 79, FIGS. 5 and 6.

At the inclined ends 86 and 88 are respectively small closure gates 96 and 97 which will be elevated as the tray 30 is slid into the enclosure and will ride upon the flange 91 and rib 92 of the tray 30 as the inclined end faces 86 or 88 are being engaged to effect the easy lifting of the lift bar 74. Recesses 98 and 99 are respectively provided to house the respective small gates 96 and 97 into which they are raised and from which they are lowered under gravity.

On the interior of each door 31 and 32 is a rubber seal strip 100 having inclined face projections 101 adapted to be extended under the flange 91 of the tray 30 at the rib 92 to replace the closure gates when the tray is in place and prevent leakage between the two compartments from under the tray edge, FIGS. 5 and 8.

In order to close off the front of the enclosure so that as the doors 31 and 32 are opened to give access to the trays and so that the whole enclosure will not be exposed to outside air at the time, a combined baffle and card holder 103 for receiving data cards 104 and 105 is removably attached to the front edge of each tray and secured to the tray by having at each end a pair of wire projections 106 adapted to enter respectively pairs of holes 107 in the flange 91 at the opposite ends of the tray, FIG. 4.

It should now be apparent that there has been provided a hot and cold food service cart in which both the hot and cold foods can be so placed upon the tray that when the tray is slid into the enclosure automatically the hot foods will be disposed in a hot compartment and the cold foods disposed in a cold compartment. It should be further apparent that provision has been made so that the cold and hot compartments can be changed in size so that for summer serving when there are a larger number of cold foods the cold compartments may be made larger to accommodate them while the heating compartment will be made smaller and accommodate the smaller amount of hot foods that are served during the summer months.

It will be further apparent that, once the hot and cold foods are placed on the tray, there is no need to take other foods from other places on the cart to add to the tray when the cart is at the delivery location and that the tray is taken from the cart and delivered to the patient with all the hot and cold foods and beverages as placed thereon in the kitchen, and with these foods having been maintained at the same temperature up to the point of delivery to the patients, the foods being delivered at the farthest location being maintained at the same temperature as that of the foods served at the nearest location and the beginning of the delivery trip.

It will be further apparent that this has all been accomplished by a divisional wall structure arranged to accommodate a vertically-extending rib of the trays and to so cooperate therewith as to prevent the leakage of air between the hot and cold compartments yet permit the handling of the tray as if it were being placed in a single compartment or enclosure. Also, that there has been provided individual baffle means for each tray to sectionalize automatically the space consumed within the enclosure by the respective trays.

While various changes may be made in the detail construction, it shall be understood that such changes shall be within the spirit and scope of the present invention as defined by the appended claims.

What is claimed is:

1. A hot and cold food service unit comprising a plurality of individual meal trays, insulated walls providing an enclosure with a door opening, rack means for removably supporting the meal trays in the interior of the enclosure in vertically-spaced relationship, heating means disposed in one side of the enclosure and cooling means disposed in the opposite side thereof, a vertically-extending normally-closed wall structure thermally dividing the enclosure into hot and cold compartments throughout the height of the enclosure and adapted to slidably receive from the door opening the individual meal trays intermediate their widths as the trays are slid through the door opening and over said rack means of the enclosure, and door means for closing the door opening of the enclosure.

2. A hot and cold food service unit comprising a plurality of individual meal trays that are divided into hot and cold food areas by a dividing portion therebetween, an enclosure with a door opening, said enclosure having rack means for removably supporting said trays in vertically-superposed spaced relationship, thermal barrier means laterally dividing said enclosure into thermally different vertically-extending compartments, said thermal barrier means having horizontally-extending slots open at the front of the enclosure to slidably receive the dividing portions of the trays from the door opening, self closing means for normally keeping the slots of the thermal barrier closed when free of the tray and engageable with the dividing portions of the trays when received therein to continue to keep the slots closed thereagainst, door means carried by the enclosure for closing said enclosure and temperature-maintaining means for at least one of said compartments.

3. A hot and cold food service unit as defined in claim 1, in which said compartments have unequal horizontal areas and said trays being correspondingly divided into unequal hot and cold food-supporting areas.

4. A hot and cold food service unit as defined in claim 1, and said door means comprising opposing doors respectively overlying the respective hot and cold food compartments so that access may be had to one compartment by opening one of the doors without opening the other door.

5. A hot and cold food service unit comprising, a plurality of individual meal trays, insulated walls providing an enclosure with a door opening, rack means for removably supporting the meal trays in the interior of the enclosure in vertically-spaced relationship, a vertically-extending wall structure thermally-dividing the enclosure into hot and cold compartments and adapted to slidably receive the meal trays intermediate their widths as the trays are slid through the door opening and over said rack of the enclosure, heating means disposed at one side of said wall structure enclosure and cooling means disposed on the opposite side thereof, and door means for closing the door opening of the enclosure, said divisional wall structure comprising a plurality of divisional wall assemblies vertically aligned one above the other, each of said wall assemblies having laterally-spaced wall pieces providing a space therebetween and a lift closure bar vertically adjustable in said space and biasing means urging said lift bar toward the assembly therebelow and toward the tray as the tray engages the forward end of the lift bar and is slid into the enclosure over the rack means.

6. A hot and cold food service unit as defined in claim 5, and said lift bar having an end cut away to provide a downward and rearwardly inclined forward end face to be engaged by the entering edge of the tray and a recess in said cut away end face, a gate pivoted within the recess and adapted to be dropped from the inclined face and into horizontal alignment with the underedge of the lift bar and upon the wall assembly therebelow, and in a similar manner upon the tray when disposed in said rack means.

7. A hot and cold food service unit as defined in claim 6, and a second and similar inclined end face diagonally opposite from the one inclined face and at the opposite end the lift bar, said lift bar thereby being adapted to be inverted from end to end and used in the reverse manner, said second inclined face having a recess therein, and a gate within said recess in this inclined face and serving to similarly accommodate the tray upon the lift bar being extended into the enclosure.

8. A hot and cold food service unit as defined in claim 7, and said laterally-spaced wall pieces respectively having flanges with their edges diverging from the front of the enclosure toward the rear thereof and a cover piece having rolled over side edges slidably extended over the edges of the flanges and removable therefrom to provide access to the lift bar space to permit the removal of the lift bar therefrom.

9. A hot and cold food service unit as defined in claim 7, said lift bar having other inclined faces disposed respectively above and below the respective gate inclined faces and diagonally opposite from one another, said laterally-spaced pieces of the assembly having top flanges and a cover piece disposed over the top flanges, an inclined projection extending upwardly from the cover member and adapted to be engaged by either one of the last-mentioned inclined faces, depending on whether the lift bar is with one edge down or inverted with the other edge down.

10. A hot and cold food service unit as defined in claim 1, said individual meal tray having a rib wall intermediate its width and extending from one edge to the other edge and received by the divisional wall structure and dividing the tray into hot and cold food supporting areas.

11. A hot and cold food service unit as defined in claim 10, wherein the tray has a forward edge, and baffle means removably secured to said forward edge of the tray to sectionalize the enclosure space for the individual tray across the door opening thereof when the trays are disposed therein.

12. A hot and cold food service unit as defined in claim 5, and the rear wall of said enclosure having a vertical opening, two vertically-extending break-away plates removably retained in the wall opening, said divisional wall assemblies being carried upon one of said plates, the other of said plates being removable to permit the one plate with the assemblies to be laterally slid and to locate the divisional wall structure at a different location to make small the one compartment while enlarging the other compartment, and said other plate being disposable in the wall opening and adjacent to the one plate but at the opposite side thereof.

13. A hot and cold food service unit as defined in claim 6, and a vertically-extending sealing strip on the door means having projections with inclined faces engageable with the inclined face of the lift bar to seal off the space between the forward edge of the lift bar and the door to prevent air leakage between the hot and cold compartments and with the underside of the tray when disposed in the enclosure.

14. A hot and cold food service unit comprising an insulated enclosure with a front opening, a meal tray, vertically-extending rack means for removably supporting the meal tray upon the tray being slid through the front opening, a normally-closed divisional wall structure within the enclosure for thermally dividing the enclosure into hot and cold compartments and for slidably receiving the tray intermediate its width, temperature maintaining means for at least one of said compartments, and front baffle means carried by the tray to close off space above the tray from the front opening when the tray is in place upon the tray rack means.

15. A hot and cold food service unit comprising a plurality of individual meal trays, each of which has a portion dividing the tray into hot and cold food areas, said unit having a cabinet with at least one compartment, means for removably supporting the trays in vertically-superposed relationship within the compartment with hot food areas thereof above each other and the cold food areas thereof above each other, normally-closed thermal barrier means dividing said compartment into thermally different zones, said thermal barrier means being aligned with the dividing portions of the trays between the hot and cold areas of said trays and adapted to receive the individual trays upon being vertically-superposed within the compartment, a door for said compartment and temperature maintaining means for at least one of said zones.

16. A hot and cold food service unit according to claim 15 in which the zones of said compartment have unequal horizontal areas and said trays being correspondingly divided into unequal hot and cold areas.

17. A hot and cold food service unit as defined in claim 16, and said thermal barrier means being mounted in said cabinet for lateral adjustment to alter the lateral width of the zones of said compartment and to permit the reverse insertion of the tray, whereby the dividing portion of the tray may be accommodated when the width of the zones has been varied by the lateral adjustment of the thermal barrier.

18. A hot and cold food service unit comprising a plurality of individual meal trays, all of said meal trays having similar hot and cold food sections and a demarcation line extending therebetween, an insulated cabinet, a door for said cabinet, rack means for removably supporting said meal trays in vertically spaced super-position in said cabinet, a vertically extending thermal barrier dividing said cabinet into two compartments spaced and of a size corresponding to said sections of said trays, said thermal barrier having vertically spaced, openable slot forming means aligned with said rack means, each of said slot forming means having elements mutually engaging each other when no tray is present and displaceable by the positioning of a tray therebetween for engaging the surfaces of said tray along such line of demarcation, and means for maintaining a temperature in one of said compartments different from the temperature in the other of said compartments.

19. Apparatus for storing and delivering meals consisting of hot and cold foods, said apparatus comprising, in combination, an insulated chest, vertical partition means located in said chest for dividing said chest into at least two side-by-side compartments, a plurality of individual meal trays, each of said trays having two sections separated by a sealing portion and corresponding in position, arrangement and size to said two compartments, said partition means comprising vertically aligned, displaceable members forming thermal barriers between said compartments, rack means for supporting said trays in vertically spaced array in said chest with said sealing portions of said trays accommodated by said displaceable members and extending through said partition means with said sections of said trays in the corresponding ones of said compartments, and temperature control means for maintaining different temperatures in said two compartments.

20. A hot and cold food service unit comprising a plurality of individual meal trays, an enclosed cabinet having insulated walls and a door opening, rack means for removably supporting said meal trays in the interior of said enclosure in vertically spaced relationship, a vertically extending, normally-closed wall structure thermally dividing said enclosure into hot and cold compartments throughout the height of the enclosure and adapted to receive from the door opening the individual meal trays intermediate their widths as the trays are slid through the door opening and over said rack means, heating means disposed on one side of said wall structure and cooling means disposed on the opposite side thereof, and a door for closing the door opening of said enclosure.

References Cited by the Examiner
UNITED STATES PATENTS

| | | | |
|---|---|---|---|
| 1,669,057 | 5/28 | Katzinger | 206—72 |
| 1,907,414 | 5/33 | Antrim | 312—236 X |
| 2,318,532 | 5/43 | Scott | 312—236 X |
| 2,386,368 | 10/45 | Taylor et al. | 34—193 |
| 2,417,470 | 5/51 | Czerwicznik | 20—68 |
| 2,574,950 | 11/51 | Ben-Dor | 312—236 X |
| 2,625,928 | 1/53 | Gould | 312—296 X |
| 2,660,036 | 11/54 | Moore | 312—296 |
| 2,797,958 | 7/57 | Podolan | 20—67 |
| 2,845,780 | 9/58 | Conklin | 312—236 X |
| 2,891,695 | 6/59 | Peters | 220—97 |
| 2,893,805 | 6/59 | Ferguson | 312—270 X |

FRANK B. SHERRY, *Primary Examiner.*
GEORGE L. BREHM, *Examiner.*